(12) United States Patent
Matero

(10) Patent No.: US 6,215,988 B1
(45) Date of Patent: *Apr. 10, 2001

(54) DUAL BAND ARCHITECTURES FOR MOBILE STATIONS

(75) Inventor: Jorma Matero, Oulu (FI)

(73) Assignee: Nokia Mobile Phones, Ltd., Salo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/321,032

(22) Filed: May 27, 1999

Related U.S. Application Data

(63) Continuation of application No. 08/856,964, filed on May 15, 1997.

(51) Int. Cl.$^7$ .................................................. H04B 1/18

(52) U.S. Cl. .................... 455/188.1; 455/76; 455/112; 455/118; 455/86; 455/207; 455/314; 455/552; 455/553

(58) Field of Search ...................... 455/575, 552, 455/553, 84, 85, 86, 76, 550, 188.1, 180.1, 180.2, 185.2, 102, 112, 118, 207, 209, 314

(56) References Cited

U.S. PATENT DOCUMENTS

| | | | |
|---|---|---|---|
| 4,972,455 | 11/1990 | Phillips et al. | 455/552 |
| 5,068,918 | 11/1991 | Verheijen et al. | 455/188.1 |
| 5,124,672 | 6/1992 | Kuisma | 332/103 |
| 5,291,474 | 3/1994 | Ikonen et al. | 370/30 |
| 5,301,367 | 4/1994 | Heinonen | 455/76 |
| 5,337,005 | 8/1994 | Fenk et al. | 455/118 |

(List continued on next page.)

FOREIGN PATENT DOCUMENTS

WO93/16560  8/1993 (WO) .

OTHER PUBLICATIONS

"High Frequency Part Of A Real Time Test Mobile Station For UMTS System Evaluations", Kari Lehtinen et al., 24$^{th}$ European Microwave Conference, vol. 2, pp. 1575–1580.

"GSM And Dect–A Dual Mode Solution", Rashidzadeh et al., Mobile Communications International 21, Apr. 1995, pp. 57–60.

Primary Examiner—Lee Nguyen
(74) Attorney, Agent, or Firm—Ohlandt, Greeley, Ruggiero & Perle, LLP

(57) ABSTRACT

A dual band user terminal (10) includes a controller (18) for outputting a BAND signal for specifying operation in one of a first frequency band or a second, higher frequency band; a single frequency synthesizer (46) that is responsive to the BAND signal for outputting an RF signal in one of two frequency bands; and an RF transceiver (11) comprising a dual band receiver that receives RF signals in the first frequency band and in the second, higher frequency band, and a dual band transmitter that transmits RF signals in the same frequency bands. The dual band receiver includes a first receiver chain that operates in the first frequency band as a single conversion receiver having a downconversion mixer that is preceded by a first filter and that is followed by second filter, and a second receiver chain that operates in the second frequency band as a dual conversion superheterodyne receiver having a first downconversion mixer preceded by a first filter and followed by a second filter coupled to a second downconversion mixer followed by a third filter. The downconversion mixer of the single conversion receiver is also the second downconversion mixer of the dual conversion superheterodyne receiver, and the second filter of the single conversion receiver is also the third filter of the dual conversion superheterodyne receiver. The dual band transmitter includes a modulator that outputs a modulated RF signal. When operating in the first frequency band the input RF signal to the modulator has a frequency that is equal to the transmitted RF signal, and when operating in the second frequency band the input RF signal has a frequency that is equal to one half of the transmitted RF signal.

4 Claims, 4 Drawing Sheets

U.S. PATENT DOCUMENTS

| | | | |
|---|---|---|---|
| 5,390,168 | 2/1995 | Vimpari | 370/30 |
| 5,392,460 | 2/1995 | Mattila et al. | 455/76 |
| 5,471,652 | 11/1995 | Hulkko | 455/76 |
| 5,519,885 | 5/1996 | Vaisanen | 455/76 |
| 5,535,432 * | 7/1996 | Dent | 455/77 |
| 5,678,222 | 10/1997 | Hornak et al. | 455/319 |
| 5,732,330 | 3/1998 | Anderson et al. | 455/118 |
| 5,896,562 | 4/1999 | Heinonen | 455/76 |
| 5,898,907 | 4/1999 | Maruyama | 455/76 |

* cited by examiner

DUAL BAND ARCHITECTURES FOR MOBILE STATIONS

This application is a continuation of copending application(s) application Ser. No. 08/856,964 filed on May 15, 1997.

FIELD OF THE INVENTION

This invention relates generally to radiotelephones and, in particular, to radiotelephones or mobile stations such as those capable of operation with a cellular network.

BACKGROUND OF THE INVENTION

The demand for so called dual mode terminals or stations is expected to increase with time. In the United States of America there is presently at least one system which supports dual mode operation, i.e., digital TDMA and analog FM, also referred to as DAMPS. As the systems such as GSM, PCS, DECT, DCS1800 and TDMA1900 become more widely used there is expected to be a need to have mobile stations which support two modes of operation, such as GSM and DCS1800 or DAMPS and TDMA1900 or DCS1900. A proposed third generation mobile telecommunication systems, such as UMTS (in ETSI) or FPLMTS (in CCIR), is under development. These advanced systems may also require some type of dual mode operation.

In an article entitled "GSM and DECT-A Dual Mode Solution", Mobile Communications International 21, April 1995, pgs. 57–60, B. Rashidzadel et al. describe an RF subsystem in FIG. 3 for a dual mode handset that operates in the GSM frequency band (890–960 MHz) and the DECT frequency band (1880–1900 MHz). In the transmitter portion a single I/Q modulator provides direct modulation at either the DECT or GSM frequency bands, and is connected through a SPDT switch to one of a DECT or a GSM transmitter chain. In the receiver portion separate DECT and GSM low noise amplifiers (LNAS) are used due to the large difference in frequencies. Following the GSM LNA and an image reject filter, the next stage is a dual stage downconversion device implemented as an integrated circuit chipset, e.g. Siemens PMB2402. In the DECT receiver, a number of currently available chipsets which employ an LNA and first downconversion stage are said to be suitable for use. A SPDT switch is employed to select one of the GSM or DECT receive chains for inputting to the last downconverter stage of the dual stage downconversion device. In this approach the second stage of the downconversion chip is common to both the GSM and DECT receive chains, which is said to result in a common second IF signal which can be digitally sampled, digitally filtered (depending on the mode of operation), and suitably demodulated.

In this approach a total of at least three local oscillator signals are required, one for the DECT downconverter, and two for the dual stage GSM, GSM/DECT downconverter. Also in this approach both the GSM and the DECT chains employ a double conversion superheterodyne receiver.

In commonly assigned Finnish Patent Application FI 961465 a dual band transmitter/receiver is disclosed that is based on direct conversion to baseband, wherein a single frequency synthesizer is used for both bands. When operating in the higher frequency band the output of the synthesizer is employed as the mixing frequency, while in the lower frequency band a mixing frequency is obtained by dividing the output frequency of the synthesizer by at least two.

OBJECTS OF THE INVENTION

It is a first object of this invention to provide a method for constructing and operating a dual band wireless user terminal, such as a personal communicator or a cellular telephone, so as to reduce the component count to achieve savings in cost, complexity, size, and power consumption.

It is a further object of this invention to provide a method for constructing and operating a dual band terminal so as to minimize a number of required frequency filters.

It is another object of this invention to provide a dual band terminal that requires but one band-switched UHF VCO, and that furthermore does not require multiplier or divider blocks to form mixing frequencies.

SUMMARY OF THE INVENTION

The foregoing and other problems are overcome and the objects of the invention are realized by a dual band user terminal that is constructed and operated in accordance with the teachings of this invention. The terminal includes a controller for outputting a BAND signal for specifying operation in one of a first frequency band or a second, higher frequency band; a single frequency synthesizer that is responsive to the BAND signal for outputting an RF signal in one of two frequency bands; and an RF transceiver comprising a dual band receiver that receives RF signals in the first frequency band and in the second, higher frequency band, and a dual band transmitter that transmits RF signals in the first frequency band and in the second, higher frequency band.

The dual band receiver includes a first receiver chain that operates in the first frequency band as a single conversion receiver (one IF) having a downconversion mixer that is preceded by a first filter and that is followed by second filter. The dual band receiver further includes a second receiver chain that operates in the second frequency band as a dual conversion superheterodyne receiver having a first downconversion mixer preceded by a first filter and followed by a second filter coupled to a second downconversion mixer followed by a third filter. The single downconversion mixer of the single conversion receiver is also the second downconversion mixer of the dual conversion superheterodyne receiver, and the second filter of the single conversion receiver is also the third filter of the dual conversion superheterodyne receiver. The second filter of the single conversion receiver has a center frequency in a range of approximately 45 MHz to approximately 60 MHz.

The dual band transmitter includes a modulator, specifically an IQ modulator, that modulates an input RF signal in accordance with information to be transmitted and that outputs a modulated RF signal. When operating in the first frequency band the input RF signal has a frequency that is equal to the transmitted RF signal, and when operating in the second frequency band the input RF signal has a frequency that is equal to one half of the transmitted RF signal. The dual band transmitter also includes an upconversion mixer that upconverts the modulated RF signal, using the input RF signal, to have a frequency equal to the transmitted RF signal when operating in the second frequency band.

In one embodiment of this invention the first filter of the single conversion receiver is also the second filter of the dual conversion superheterodyne receiver.

In both embodiments of this invention the first and second downconversion mixers of the dual conversion superheterodyne receiver are both supplied with the same mixing frequency from the single frequency synthesizer.

In a first embodiment of this invention the first frequency band includes 890–915 MHz and 935–960 MHz, and in a second embodiment the first frequency band includes 829–849 MHz and 869–894 MHz.

Also in the first embodiment of this invention the second frequency band includes 1710–1785 MHz and 1805–1880 MHz, and in the second embodiment the second frequency band includes 1850–1910 MHz and 1930–1990 MHz.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
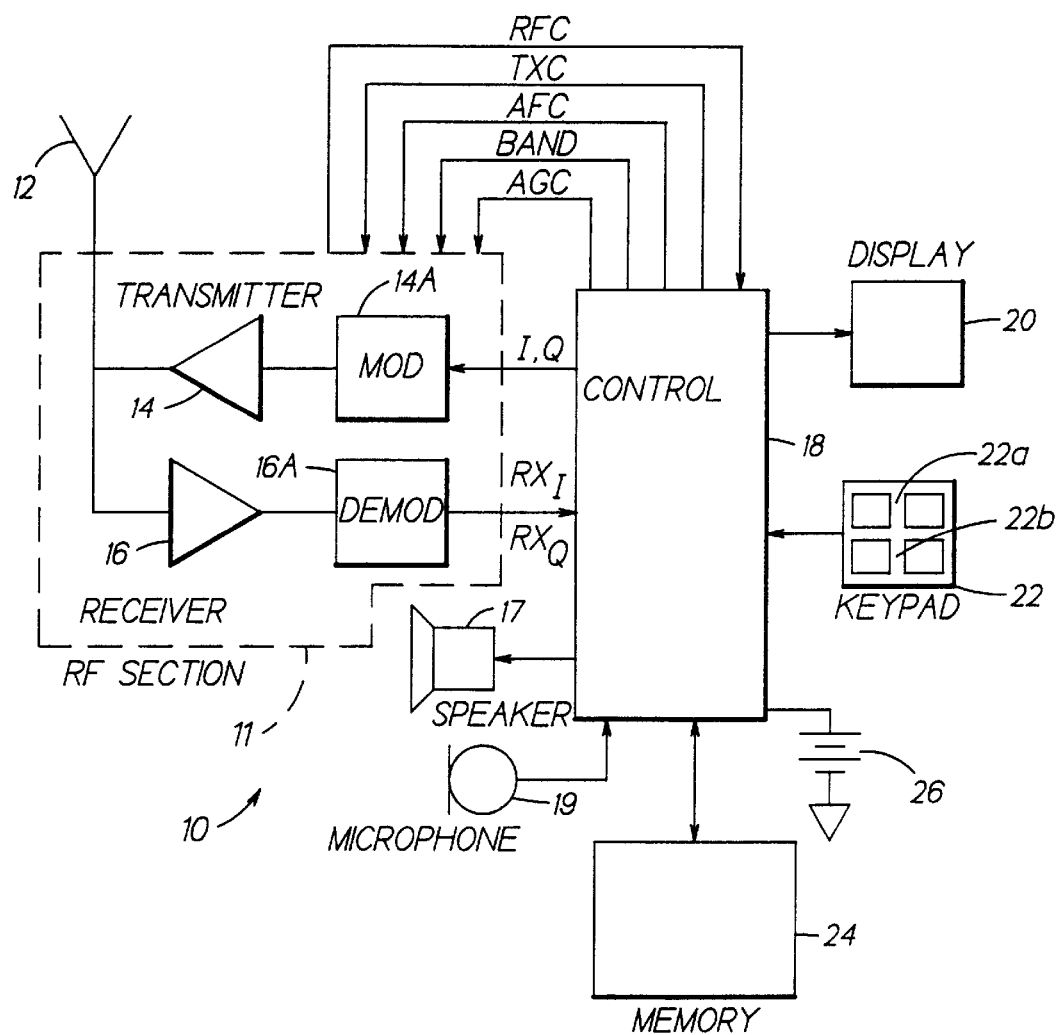
FIG. 1 is a block diagram of a mobile station that is constructed and operated in accordance with this invention.
Figure 2:
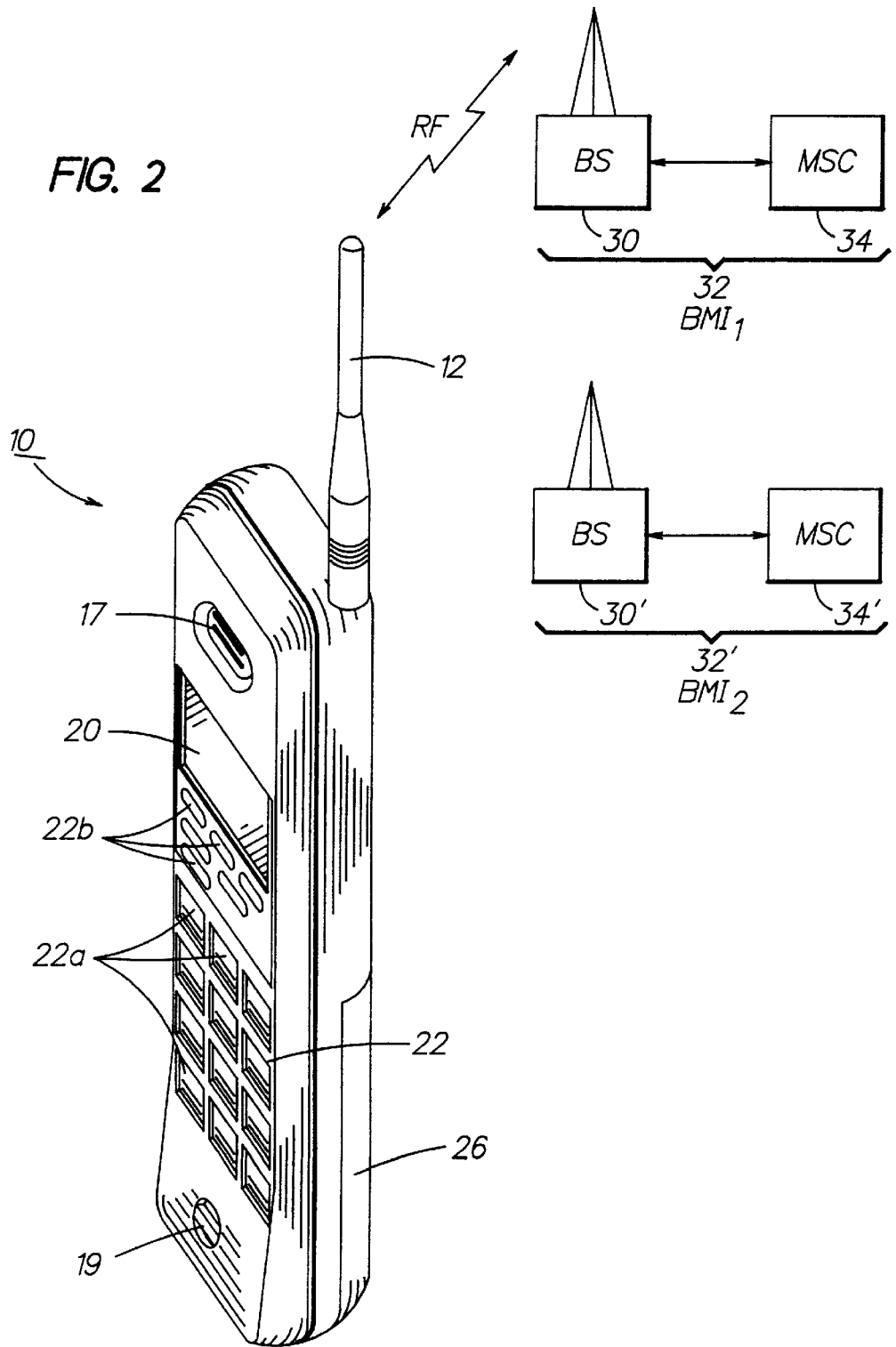
FIG. 2 is an elevational view of the mobile station shown in FIG. 1, and which further illustrates different cellular communication systems to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes at least one antenna 12 for transmitting signals to and for receiving signals from a first base site or base station 30. The base station 30 is a part of a first cellular network comprising a Base Station/Mobile Switching Center/Interworking function ($BMI_1$) 32 that includes a mobile switching center (MSC) 34. The MSC 34 provides a connection to landline trunks when the mobile station 10 is involved in a call.

FIG. 2 also shows a second $BMI_2$ 32', having associated base station(s) 30' and MSC 32'. By example, $BMI_1$ 32 may be a first digital system or an analog system (e.g., GSM or DAMPS), and $BMI_2$ 32' may be a second digital system (e.g., DCS1800 or DCS1900). This invention provides a mechanism for the mobile station 10 to switch between the frequency bands of the first and second systems in an automatic and user-transparent manner.

Figure 3:
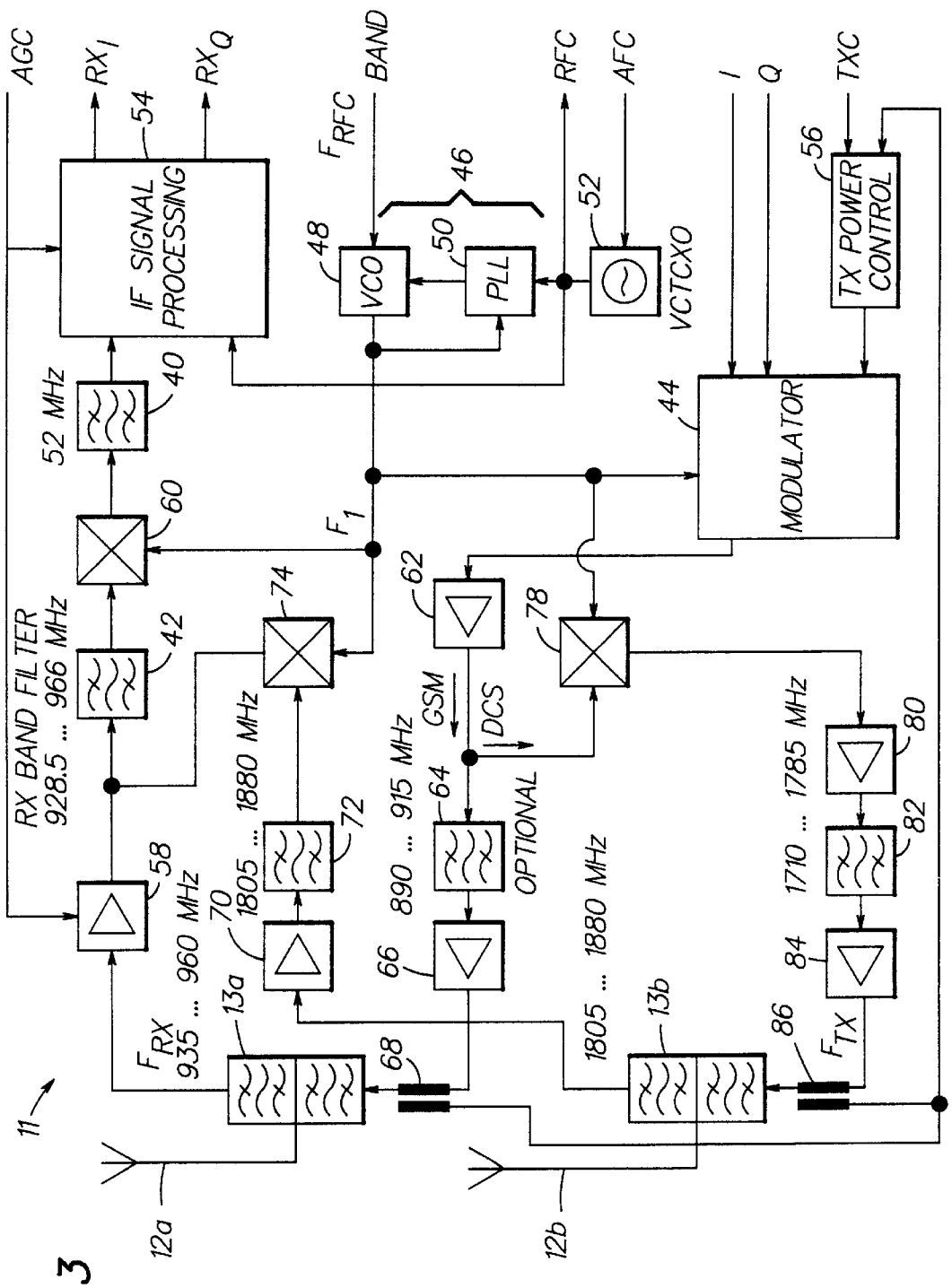
FIG. 3 is a block diagram of a first embodiment of this invention, specifically a dual band GSM/DCS1800 RF transceiver.
Figure 4:
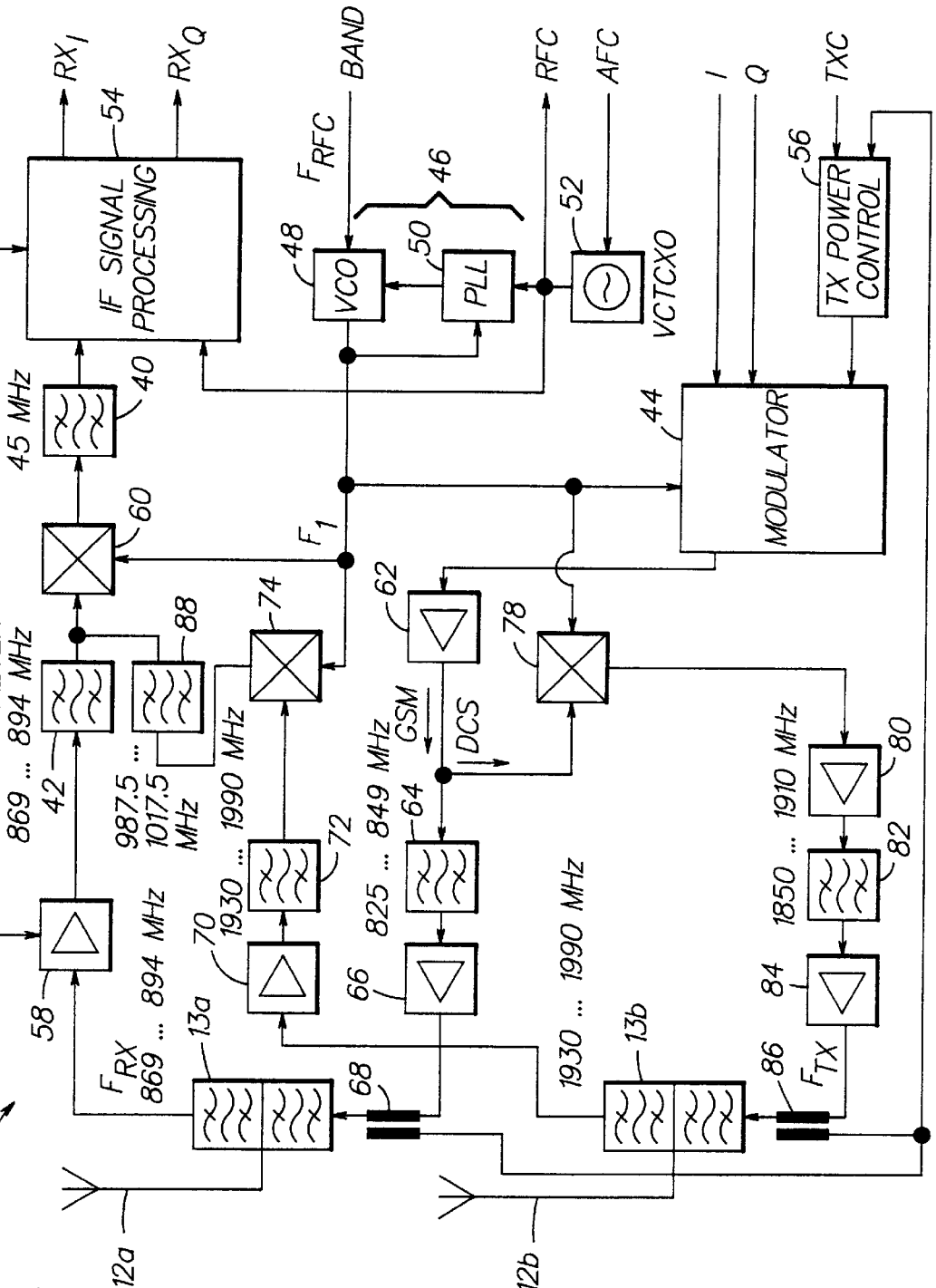
FIG. 4 is a block diagram of a second embodiment of this invention, specifically a dual band DAMPS/TDMA1900 or DCS1900 RF transceiver.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. For the purposes of this invention the transmitter, receiver, modulator and demodulator are all considered to be dual-mode capable, and can operate with the frequencies, modulation type, access type, etc. of the first and second systems. FIGS. 3 and 4, described below, illustrate two exemplary embodiments of circuitry that implement the RF transceiver section 11 in accordance with this invention.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 or the BMI 32' prior to the display of the messages to the user.

FIGS. 3 and 4 illustrate two exemplary dual band architectures for the RF transceiver section 11 of FIG. 1. With these architectures it is possible to employ, in a 1.9 GHz transceiver, a low IF frequency in the range of about 45 MHz to 60 MHz. This capability results in a less expensive IF filter 40. In the GSM/DCS1800 architecture of FIG. 3 a 900 MHz receiver (RX) GSM band filter 42 is also used as a first IF filter for the DCS1800 receiver. In both embodiments a single dual-mode modulator 44 operates in the 800 MHz to 960 MHz band, which simplifies the implementation and which further makes analog mode duplex operation possible. The transmitter (TX) filtering requirements are reduced since the modulator 44 operates on the final transmitter frequency in the GSM mode, while in the DCS1800 mode the mixed frequencies are high, which facilitates achieving the desired filter shape factors. In either embodiment filtering may be implemented with microstriplines.

For optimum results a fractional N UHF synthesizer 46 is preferred, comprised of a band-switched Voltage Controlled Oscillator (VCO) 48, a phase locked loop (PLL) 50, and a reference oscillator VCTCXO 52 which receives a tuning signal (AFC) to provide an Automatic Frequency Control (AFC) capability. For the GSM/DCS1800 architecture illustrated in FIG. 3 a conventional synthesizer implementation can also be used. In this case, and for the 1800 MHz band, the reference frequency (RFC) is preferably 100 kHz. The two architectures illustrated in FIGS. 3 and 4 provide a wide flexibility in implementing advanced IF processing techniques, since in both cases it is possible to achieve IF frequencies below 100 MHz. The illustrated embodiments may also be extended to other dual band applications, and are not limited to only the disclosed and exemplary embodiments.

Referring again briefly to FIG. 1, in conjunction with FIGS. 3 and 4, a number of signals flow between the controller 18 and the RF transceiver section 11. Outputs from the controller 18 include an Automatic Gain Control (AGC) signal, a BAND signal for specifying VCO operation in either the first or second frequency bands, the AFC signal for specifying to the VCTCXO 52 an amount of frequency control, and a transmitter power setting signal (TXC) that is input to a TX power control block 56. Data to be transmitted is expressed as In-phase (I) and Quadrature (Q) signals for application to the modulator 44. DSP clock and sampling signals that are used in the controller 18 are generated from the Reference Frequency Clock (RFC) signal, which is controlled by the AFC signal which is generated from the received I and Q signals (RXI and RXQ) output from an IF processing block (a demodulator) 54. The frequency of the VCTCXO 52 is a function of the symbol rate of the intended application. By example, for GSM and DCS1900 applications a frequency of 13 MHz can be used, while for DAMPS or TDMA1900 applications a frequency of 19.44 MHz can be used, as can one half of this frequency (i.e., 9.72 MHz).

In both illustrated embodiments two separate antennas 12a and 12b are employed, each having an associated duplexer 13a and 13b, respectively. In other embodiments a single, dual band antenna can be employed.

Referring now specifically to the GSM/DCS1800 dual band embodiment shown in FIG. 3, the operation is as follows. When the BAND signal specifies the GSM mode of operation, the GSM receiver, comprised of amplifier 58, the RX band filter 42, a single downconversion mixer 60, and the 52 MHz IF filter 40, operates as single conversion receiver. The duplexer 13a, and RX band filter 42 provide the required image frequency rejection. The IF signal processing block 54 generates its clock and sampling frequencies from the reference oscillator signal RFC. The transmitter modulator 44 operates on the TX frequency ($F_1$) output from the VCO 48, and the duplexer 13a transmit section provides the necessary filtering for GSM operation. The output of the modulator 44 is supplied to a first transmitter amplifier 62, to an (optional) 890–915 MHz transmit filter 64, and to a final power amplifier 66. A directional coupler 68 is used to sense the transmitter power and to feed back the sensed power to the TX power control block 56, providing closed loop transmitter power control at a level set by the TXC signal. The synthesizer 46 operates in the 883–908 MHz band during receive and in the 890–915 MHz band during transmission.

When the BAND signal specifies operation in the DCS1800 mode, the DCS receiver, comprised in part of an amplifier 70, 1800 MHz filter 72, and first downconversion mixer 74, operates as a double conversion superheterodyne receiver, as opposed to the single conversion GSM receiver. In accordance with an aspect of this invention, the DCS receiver uses the, F1 signal for both mixers, i.e., the first downconversion mixer 74 and the second downconversion mixer 60 (which operates as the sole downconversion mixer in the GSM mode). In addition, the DCS receiver uses the RX band filter 42 as a first IF filter and the 52 MHz filter 40 as the second IF filter. The GSM and DCS receivers thus have a common final 52 MHz IF filter 40, a common downconversion mixer 60, and a common 900 MHz filter 42. The 1.8 GHZ filter 72 and the RX band filter 42 have been found to provide sufficient image attenuation for the second mixer 60. This makes it possible to use the single (low cost) 52 MHz filter 40 in both modes of operation.

In the transmitter section the modulator 44 operates at the F1 frequency, which is set to be one half of the final transmitted frequency. The modulated signal is amplified by amplifier 62, then is upconverted in upconversion mixer 78 with the VCO signal F1 to the final TX frequency (1710–1785 MHz). The upconverted transmitter frequency is supplied to first amplifier 80, transmit filter 82, and final power amplifier 84. A second directional coupler 86 senses the transmitted DCS power, and supplies a signal to the TX power control block 56. This embodiment provides good isolation from the transmitter to the synthesizer 46, which operates in the 869.5–914 MHz band during receive and in the 855–892 MHz band during transmission (i.e., one half of the DCS frequency band).

Referring now to the DAMPS/DCS1900 dual band embodiment shown in FIG. 4, components that function as in FIG. 3 are numbered accordingly, although the frequencies of operation are different. This embodiment can also be applied to DCS1900/AMPS and TDMA1900/AMPS applications.

More specifically, in the embodiment of FIG. 4 the IF filter 40 is a 45 MHz filter, the RX band filter 42 is an 869–894 MHz filter, the low band transmit filter 64 is an 825–849 MHz filter, the high band receive filter 72 is a 1930–1990 MHz filter, and the high band transmit filter 82 is an 1850–1910 MHz filter. One significant difference is the additional high band first IF filter 88, which operates in the 987.5–1017.5 MHz band. The required analog mode duplex operation results in 45 MHz as being a preferred choice for the IF frequency, and thus sets the passband value for the filter 40.

It is noted that the GSM bandwidth is 200 kHz, while the DAMPS bandwidth is 30 kHz. If necessary, further filtering can be done in the IF block 54. By example, tuneable IQ filters can be used in the IF block 54.

For optimum performance the synthesizer 46 is preferably implemented using a fractional N PLL 50, which also gives additional freedom in selecting the frequency of the VCTCXO 52.

When operating in the DAMPS mode the low band receiver operates as single conversion receiver, which has the 45 MHz IF frequency. The duplexer 13a and RX band filter 42 provide the required image frequency rejection. As in the embodiment of FIG. 3, the IF signal processing block 54 generates its clock and sampling frequencies from the RFC signal. The transmitter modulator 44 operates at the final transmitter frequency (825–849 MHz), and the duplexer 13a transmit section provides the necessary filtering for the DAMPS operation. The filter 64 is preferably used for duplex analog mode operations, as it removes noise from the modulator 44. The use of the filter 64 can thus beneficially relax the duplexer filtering requirements.

In that the IF frequency is selected to be 45 MHz, it is possible to have analog mode duplex operation, and the synthesizer 46 operates in the 824–849 MHz band during both during receive and transmit.

Operation in the TDMA (DCS) 1900 mode is as follows. The receiver operates as a double conversion superheterodyne, and uses the F1 signal for both downconversion mixers 74 and 60. The 1900 MHz received signal is downconverted to the 900 MHz band in the first mixer 74, and is filtered with the additional 987.5–1017.5 MHz filter 88. Filtering in this passband has been found to provide sufficient image frequency attenuation for the second downconversion mixer 60 (which operates in the 869–894 MHz band in the DAMPS mode). In this manner it becomes possible to use the common, low cost 45 MHz filter for both frequency bands of interest.

In the transmitter section, as in the embodiment of FIG. 3, the modulator 44 operates at the F1 frequency, which is set to be one half of the final transmitted frequency. The modulated signal is amplified by amplifier 62 and is upconverted in upconversion mixer 78 with the VCO signal F1 to the final TX frequency (1850–1910 MHz). The upconverted transmitter frequency is supplied to first amplifier 80, transmit filter 82, and final power amplifier 84. The second directional coupler 86 senses the transmitted power, and supplies the transmitted power sense signal to the TX power control block 56. This embodiment also provides good isolation from the transmitter to the synthesizer 46, which operates in the 942.5–972.5 MHz band during reception and in the 925–955 MHz band during transmission. The preferred method to operate the modulator 44 when in the analog mode is as an IQ/FM modulator. One suitable embodiment of such a modulator is found in commonly assigned U.S. Pat. No. 5,124,672, entitled "Combined Analog/Digital Frequency Modulator", by Erkki J. Kuisma. Another approach is disclosed in commonly assigned U.S. Pat. No. 5,392,460, entitled "Dual Mode Radiotelephone Terminal Selectively Operable for Frequency Modulated or Phase Modulated Operation", by Heikki Mattila, Jorma Matero, and Jaakko Hulkko.

In the embodiments of FIGS. 3 and 4 the BAND signal may be employed to also operate electronic switches (e.g., FET switches) to disconnect those circuits that are used only in the non-selected band, and/or to place such circuits in a low power or unpowered mode of operation. By example, and referring to FIG. 3, the BAND signal could be used to multiplex the transmitter control signals. Conversely, when operating in the GSM mode the BAND signal can be used to open the path to the input of the upconversion mixer 78, and/or to place the mixer 78, and the amplifiers 80 and 84, in a low power consumption mode. One or more isolation switches can also be employed in the signal path(s). By example, an isolation switch can be used between the amplifier 62 and the filter 64, as can an isolation switch between the amplifier 62 and the mixer 78.

The use of the techniques disclosed above has been found to enable a 20–30% reduction in the number of components when constructing a dual band user terminal, thereby providing significant savings in cost, complexity, size and power consumption. The use of these techniques also overcomes the problems presented by prior art approaches, such as by eliminating a requirement to provide a frequency synthesizer for both bands, in addition to a common offset synthesizer. The use of this invention also provides an optimum phase noise performance for the UHF synthesizer 46, as the frequency is reduced in the higher frequency band, while providing a reduced bandwidth requirement for the modulator 44. The modulator and PLL circuits can also be operated at frequencies below 1 GHz, thus facilitating the integration of these components.

Although described in the context of preferred embodiments, it should be realized that a number of modifications to these teachings may occur to one skilled in the art. By example, the teachings of this invention are not limited to only the specific frequency bands and filter frequencies described above. Thus, while the invention has been particularly shown and described with respect to preferred embodiments thereof, it will be understood by those skilled in the art that changes in form and details may be made therein without departing from the scope and spirit of the invention.

What is claimed is:

1. A multiband user terminal, comprising:
   a controller for outputting a BAND signal for specifying operation in at least one of a first frequency band or a second, higher frequency band;
   a single frequency synthesizer that is responsive to said BAND signal for outputting a local oscillator RF signal when operating in said first frequency band or said second frequency band; and
   an RF transceiver comprising a multiband receiver that receives RF signals in said first frequency band and in said second, higher frequency band, and a multiband transmitter that outputs a transmitted RF signal when operating in said first frequency band or in said second, higher frequency band, wherein said multiband transmitter comprises
   a modulator that modulates said local oscillator RF signal in accordance with information to be transmitted and that outputs a modulated RF signal, wherein when operating in said first frequency band said local oscillator RF signal has a frequency that is equal to said transmitted RF signal, and wherein when operating in said second frequency band said local oscillator RF signal has a frequency that is equal to one half of said transmitted RF signal, and further comprising an upconversion mixer having a first input for receiving said modulated RF signal and a second input that receives said local oscillator RF signal, wherein said upconversion mixer upconverts said modulated RF signal, using said local oscillator RF signal, to have a frequency equal to said transmitted RF signal when operating in said second, higher frequency band,
   wherein said multiband receiver comprises a first receiver chain that operates in said first frequency band as a single conversion receiver having a downconversion mixer that is preceded by a first filter and that is followed by second filter, and further comprising a second receiver chain that operates in said second frequency band as a dual conversion superheterodyne receiver having a first downconversion mixer preceded by a first filter and followed by a second filter coupled to a second downconversion mixer followed by a third filter, wherein said downconversion mixer of said single conversion receiver is also said second downconversion mixer of said dual conversion superheterodyne receiver, and wherein said second filter of said single conversion receiver is also said third filter of said dual conversion superheterodyne receiver.

2. A multiband user terminal as in claim 1, wherein said first filter of said single conversion receiver is also said second filter of said dual conversion superheterodyne receiver.

3. A multiband user terminal as in claim 1, wherein said first and second downconversion mixers of said dual conversion superheterodyne receiver are both supplied with the same mixing frequency from said single frequency synthesizer.

4. A multiband user terminal as in claim 1, wherein said second filter of said single conversion receiver has a center frequency in a range of approximately 45 MHz to approximately 60 MHz.

* * * * *